United States Patent [19]

Springer

[11] 4,414,554
[45] Nov. 8, 1983

[54] MAGNETIC IMAGING APPARATUS

[75] Inventor: Gilbert D. Springer, Sunnyvale, Calif.

[73] Assignee: Ferix Corporation, Sunnyvale, Calif.

[21] Appl. No.: 170,788

[22] Filed: Jul. 21, 1980

[51] Int. Cl.³ .......................................... G01D 15/12
[52] U.S. Cl. .................................................. 346/74.5
[58] Field of Search ..................... 346/74.2, 74.5, 155; 360/125, 126; 335/282, 299; 336/223

[56] References Cited

U.S. PATENT DOCUMENTS

| | | | |
|---|---|---|---|
| 2,820,956 | 1/1958 | Rueger | 346/74.2 |
| 2,841,461 | 7/1958 | Gleason | 346/74.2 |
| 2,950,161 | 8/1960 | Rueger | 346/74.5 |
| 2,982,889 | 5/1961 | Whearley | 335/299 |
| 3,898,674 | 8/1975 | Koch | 346/155 |
| 4,054,922 | 10/1977 | Fichter | 346/74.5 X |
| 4,146,858 | 3/1979 | McDermott | 335/299 X |
| 4,295,173 | 10/1981 | Romankiw et al. | 360/125 |

FOREIGN PATENT DOCUMENTS 848217 9/1960 United Kingdom .

*Primary Examiner*—Thomas H. Tarcza
*Attorney, Agent, or Firm*—Kolisch, Hartwell & Dickinson

[57] ABSTRACT

Apparatus for producing in a magnetic image-storage medium a high-resolution, smooth-edge-defining magnetic image. Such is accomplished through the cooperative action of two, opposite-polarity, concentric magnetic poles which function to create, on a face in such a medium, a somewhat doughnut-shaped defined magnetized zone, which zone is characterized by multi-directionally oriented magnetic vectors distributed generally with spherical geometry. The magnetic poles are created by exciting electrically magnetic-flux-inducing spiral coils which are spaced from the magnetic poles.

10 Claims, 10 Drawing Figures

MAGNETIC IMAGING APPARATUS

BACKGROUND AND SUMMARY OF THE INVENTION

This invention pertains to apparatus for producing, in a magnetic image-storage medium, a high-resolution, smooth-edge-defining magnetic image. More particularly, it relates to the production of a generally doughnut-shaped magnetized region in such a medium, which region functions as a portion of a total magnetic image, with magnetization in the region characterized by multi-directionally oriented magnetic vectors distributed generally with spherical geometry. The magnetic field for producing the magnetized region is generated by the induction of magnetic flux by an electricity-conducting spiral coil spaced from the field.

For the purpose of illustration, embodiment of the invention are described herein in the setting of electromagnetic printers, wherein the invention has been found to have particular utility.

In recent years, there has been much interest in the development of electromagnetic printers. The basic operational mode for such a printer is that electromagnetic "writing heads" are used to create discrete magnetized regions in an expanse of a magnetic image-storage medium—thus to create the desired image—with this region then suitably coated with a magnetizable powdered toner which is later transferred in a variety of ways to a sheet of paper, or the like.

In the past, the individually magnetized regions which combine to form an overall image have been produced in two principal ways. One of these is referred to as linear perpendicular magnetizing, and the other as linear longitudinal magnetizing. The first of these prior art techniques produces a magnetized region through a pair of North-South poles disposed along an axis which is substantially normal to the plane of an image-storage medium. Such a technique results, predominantly, in normally directed magnetic vectors (relative to the plane of the medium) in the magnetized region. The second-mentioned technique uses a pair of confronting North-South poles placed along one side, and parallel to the plane, of an image-storage medium. This technique produces a magnetized region with magnetic vectors directed substantially within a plane paralleling that of the medium.

Among the problems which have plagued apparatus employing each of these magnetizing techniques has been that the finally magnetized regions do not exhibit an especially high degree of toner-collecting capability, particularly in the zones between adjacent magnetized regions. As a consequence of this, edge definition in a resulting printed image is often quite poor. This becomes especially apparent in the printing of alpha/numeric characters whose edges can appear to be jagged rather than smooth and continuous.

One technique of which applicant is aware has been developed to overcome this problem is disclosed in U.S. Pat. No. 2,950,161 issued to W. J. Rueger, entitled "Coaxial Magnetic Printing Head". The invention therein described includes a cylindrical inner magnetic-flux-permeable core surrounded by an electrically conductive sleeve functioning as a single coil. The sleeve is in turn surrounded by an outer magnetic-flux-permeable base. When the sleeve is conducting, a magnetic field is produced between coplanar faces of the core and base across the sleeve.

Although this invention solves the above-described problem, it has other limitations. These limitations include the inherent interdependency between size of the coil and size of the resulting magnetic field. In brief, the field size is determined from the coil size.

Additionally, the amount of flux induced by the coil is limited to that provided by a single coil. In the Rueger patent, it appears that this is compensated for by increasing the size of the coil. This requires more power to operate and results in an enlarged magnetic field.

A general object of the present invention is to provide a unique apparatus for overcoming such deficiencies in a highly satisfactory, and relatively simple manner.

More specifically, an object of the invention is to provide such an apparatus which is capable of producing a magnetic image, in which individual magnetized regions exhibit a very high degree of toner-capturing capability, coupled with a propensity for the zones of adjacency between such regions also to exhibit high toner-collecting capacity.

Yet another object of the invention, and one which relates to the preceeding object, is to provide such an apparatus wherein extremely good edge definition (continuous smoothness) is attainable in the edges of a printed image.

It is a further and primary object of the invention to provide such a method and apparatus which divorces the size of the magnetic poles, and, therefore, the resulting field, from the coil inducing magnetic flux.

According to a preferred embodiment of the present invention, such magnetic imaging is accomplished through the cooperative action of two opposite-polarity concentric magnetic poles created by magnetic flux induced with a spiral coil spaced from the poles. These poles function to create, on a face in a magnetic storage medium, a somewhat doughnut-shaped magnetized zone, which zone is characterized by multi-directionally oriented magnetic vectors that are distributed generally with spherical geometry. By creating magnetized zones characterized by spherical magnetic-vector geometry, each individual zone exhibits an extremely high capacity for capturing toner. Further, immediately adjacent regions all experience confronting or opposing magnetic vectors, which results in the zones between adjacent regions also exhibiting high toner-collecting capability. With such geometry attained for each individual magnetized zone, and considering that a string of such zones will define the edge of an image, the toner-collecting capability exhibited in the indentations between adjacent zones avoids the development of a jagged edge in a finally printed image.

Also, by physically separating the magnetic field and the coil inducing the magnetic flux which creates the magnetic field, substantially reduced field sizes are available. The size limitation is then a constraint caused by construction methods rather than by coil requirements. The use of spiral coils also multiplies the effectiveness of the coil in inducing a desired amount of magnetic flux.

In order to explain the extreme versatility of the proposed invention, and after there is given below a general description of the basic apparatus required to perform the invention, several specific writing head constructions are described, which constructions have been shown to offer a high degree of utility. In each of these constructions, a generally coplanar concentric opposite-polarity pole configuration is used to achieve the desired doughnut-shaped magnetized region with spherical-geometry magnetic vectors.

Another important feature of the invention is that magnetic pole pairs having the desired geometry can be formed in extremely small regions within very thin-film versatile materials. As a consequence, very high-quality, high-resolution, low-power-consumption, and low-cost magnetic writing is made possible by the invention.

These and other objects and advantages which are attained by the invention will become more fully apparent as the description which now follows is read in conjunction with the accompanying drawings.

DETAILED DESCRIPTION OF THE INVENTION

Figure 1:
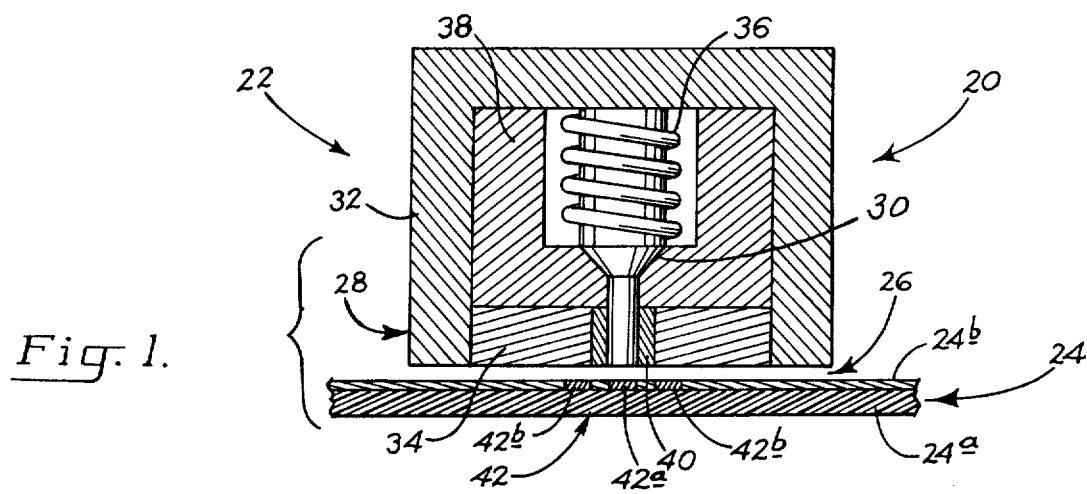
FIG. 1 is a simplified schematic side view of a portion of an imaging system, including a representative single writing head constructed in accordance with the present invention.

Turning now to the drawings, and referring first to FIG. 1, indicated generally at 20, in schematic and very simplified form, is a portion of what is called herein an imaging or printing system employing a writing head 22 which is constructed in accordance with the present invention. Head 22 is also referred to herein as a magnetic pole structure, or means. Further, head 22 is sometimes called a magnetic field-creating means. Head 22 herein is used, as will be explained, to produce different magnetized regions in the face of a generally sheet-like image-storage medium, such as the magnetic belt shown fragmentarily at 24. Belt 24 is supported on a suitable conventional transport system, and is held with an upper facial expanse therein in FIG. 1 in close proximity to the underside of head 22. The space intermediate the head and the belt is referred to herein as an image-producing zone, and is designated generally at 26.

In general terms, each magnetized region produced by head 22 in the face of belt 24 is intended to be relatively small, and to form but a portion of an overall final image. With an image formed in an expanse of the belt face, the same, prior to printing, is exposed to a suitable magnetic toner which the belt collects. The toned image is then brought into contact with a suitable printing paper, and a final print is produced. The means and mechanism for toning an image in the belt, and for transferring the toned image onto paper, form no part of the present invention, and thus are not discussed any further herein.

It should be understood before proceeding, that the head structure which is illustrated in FIG. 1 is shown simply for the purpose of illustrating the basic concept of the construction and method proposed according to the invention. Ultimately it is desirable that a plurality of closely adjacent heads be used, which heads are of very small size, in order to be able to produce high-quality, high-resolution images. A head structure according to that which is shown in FIG. 1 would simply be too bulky for this purpose. Nevertheless, such a head structure, in the development and initial practicing of this invention, has in fact been built and tested satisfactorily to prove the utility of the underlying concept of this invention.

Head 22 includes a pair of pole members, or means, 28, 30. Member 28 takes the form of a yoke, having an upper, generally inverted, cylindrical U-shaped cup 32, closed off at its bottom end in FIG. 1 by a circular plate 34. Cup 32 and plate 34 are formed of a suitable magnetic material, such as silicon steel. Plate 34 includes a central cylindrical opening 34a. Member 28 is referred to herein as a second pole means.

Pole member 30 takes the form of a central, generally cylindrical stem, joined, and magnetically connected adjacent its upper end, with the underside of the top portion of cup 32. The lower end of this member extends centrally through opening 34, with its bottom surface substantially flush with the bottom surface of plate 34. Member 30 is also formed of silicon steel, and is referred to as a first pole means.

Distributed in multiple turns around the upper portion of pole member 30, within cup 32, is a conductive coil designated generally at 36. The opposite ends of this coil extend outside of the cup, and are connected to a suitable source of DC current. Coil 36 is referred to herein as an exciting means, spiral coil means and magnetic flux-inducing means.

Filling the space surrounding member 30 within cup 32 is a generally cylindrical brass filler 38 which acts as a diamagnetic material. Further, filling the annular space between the lower end of pole member 30 and opening 34a is a gold-plated copper collar 40. Collar 40 also functions as a diamagnetic material—in the annular gap between the lower end of member 30 and opening 34a. The lower end of collar 40 is substantially flush with the bottom surface of plate 34 in FIG. 1.

For the purpose of explaining the underlying concept of the invention, the actual dimensions which are used in the parts that have just been described in head 22 are not critical. Dimensions which have been found to be satisfactory in smaller-dimension head structures of greater practical application will be described in conjunction with the embodiments stil to be described with reference to FIGS. 5-10, inclusive.

What has been described so far in the makeup of head 22 embodies the critical structural arrangement of the present invention. In particular, what is embodied is a concentric pole arrangement, including a central pole (the lower end face of member 30) surrounded, preferable symmetrically, by a circumferentia pole (defined by the underside rim portion of plate 34 which immediately surrounds opening 34a).

For the purpose of explanation herein, belt 24 may be considered to have an entirely conventional construction including a flexible backing 24a which carries a magnetizable layer shown at 24b.

Figure 2:
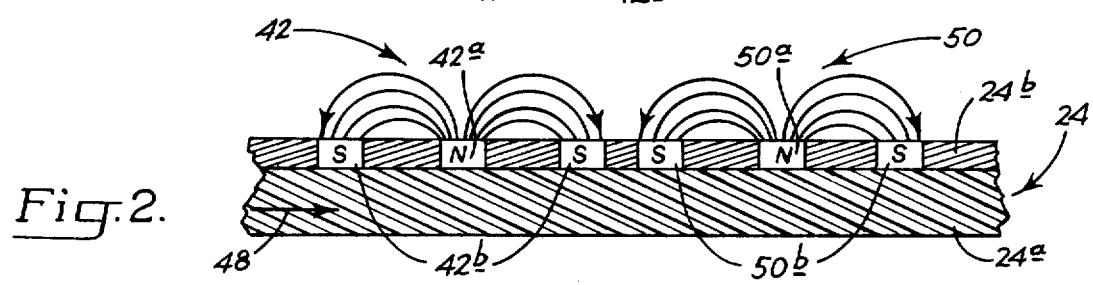
FIG. 2 is a view, on a larger scale than FIG. 1, illustrating a portion of a magnetic image-storage medium with magnetized regions produced therein by the apparatus of FIG. 1.
Figure 3:
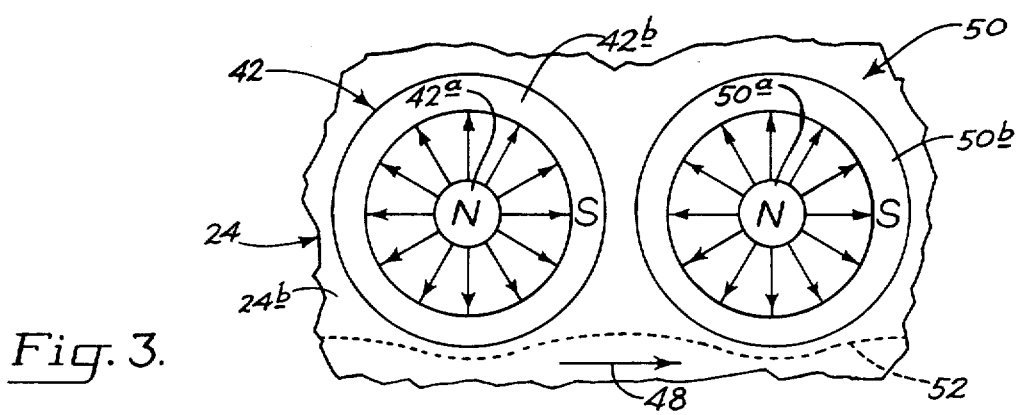
FIG. 3 is a fragmentary view taken from the top side of FIG. 2.
Figure 4:
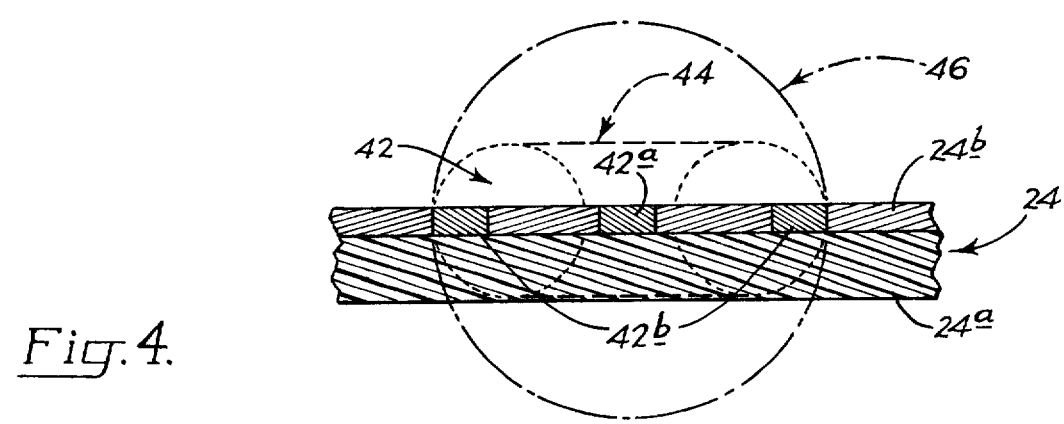
FIG. 4 is similar to a portion of FIG. 2, and is used herein to illustrate and describe the distribution of magnetic vectors which are produced in a magnetized region of an image-storage medium, according to the invention.

Referring now to FIGS. 2-4, inclusive, along with FIG. 1, with belt 24 in the position shown for it in FIG. 1 relative to head 22, and with exciting of the head, a magnetized region designated at 42 is created according to the invention in layer 24b. This magnetized region takes the form of a generally circular central portion 42a, surrounded substantially symmetrically by an annular portion 42b. Portion 42a in FIGS. 2 and 3 is labeled with the letter "N" to indicate that it represents a North pole of magnetization, whereas portion 42b is labeled with the letter "S", indicating that it represents a South pole of magnetization.

Such a magnetized region results from the geometry of head 22 in the region of collar 40, and from the fact that the collar inhibits the existence of magnetic flux in the gap between the lower end of member 30 and the inside of opening 34a. As a consequence, and in order for a magnetic circuit to be completed with exciting of head 22, lines of magnetic flux extend, with a somewhat doughnut-shaped distribution, across the gap in the air space within zone 26 occupied by belt layer 24b. As a consequence, the magnetic geometry of magnetized region 42 is also characterized by a generally doughnut-shaped zone, with magnetic vectors distributed with spherical geometry. In FIG. 2, lines representing lines of magnetic flux are seen to bulge upwardly from central portion 42a outwardly toward circumferential portion 42b. Referring to FIG. 3, arrows are used therein to show the radial nature of these lines between the two portions of region 42.

Referring for a moment to FIG. 4, this drawing is used to illustrate a little more fully the magnetic geometry of region 42. In particular, the magnetic flux lines which couple central portion 42a with circumferential portion 42b, define what may be thought of as a doughnut-shaped region represented generally by the dashed lines shown at 44. With such a distribution of flux lines, straight lines drawn tangent to all of these lines at all possible points represent magnetic vectors in the geometry of the region, and it will be immediately apparent that these vectors, collectively, are directed in space with substantially complete spherical geometry. This is represented by dash-dot line 46.

The situation which has just been described is one which ideally would exist in layer 24b, in the absence of any preferential magnetic bias in this layer. However, it is conventional that the magnetizable region in a medium such as belt 24 does indeed have a preselected magnetic bias. For the purpose of explanation herein, it will be assumed that layer 24b is biased in the direction indicated by arrow 48 in FIGS. 2 and 3, with the arrowhead indicating the North-pole direction in this bias shceme. As a consequence of bias in layer 24b, the bias vector interacts in the layer with the vectors created through operation of head 22, to create a slightly warped or modified version of the magnetic geometry which has just been described in its ideal form. In every location of interaction between any two such vectors which are not completely in line with one another and directly aiding, a magnetic interaction occurs which produces air flux lines that aid in the capturing of toner, along with the flux lines created specifically by exciting of head 22.

Experience has shown that a magnetized region having the geometry just described for region 42 exhibits a very high degree of toner-collecting capability, with an accompanying very high degree of toner edge definition.

As was mentioned earlier, a magnetized region, such as region 42, is intended in a practical printing application to be an extremely small region, and to form but a portion of an overall image. That image may, of course, be an alpha/numeric character, a line in a graph or drawing, etc., or part of a field defining an expansive image of some other nature. Accordingly, it is contemplated that to form an overall image, multiple, relatively closely spaced magnetized regions, distributed in a variety of preselected patterns, will be used. As will now be explained, the magnetic geometry of each such region, such as region 42, provides, according to the invention, a unique and important magnetic interaction between adjacent regions.

Referring still to FIGS. 1, 2 and 3, let us assume that belt 24 is shifted somewhat to the left in FIG. 1 relative to head 22, and that the head is again excited to produce yet another, adjacent magnetized region. Such a region is represented generally at 50 in FIGS. 2 and 3. Like region 42, region 50 includes a central portion 50a, surrounded substantially symmetrically by a circumferential portion 50b. The magnetic geometry of region 50 is substantially the same as that of region 42.

From an inspection of FIGS. 2 and 3, it will be noticed that, in the zone of adjacency between regions 42, 50, the regions' magnetic vectors include components that are in confronting opposition to one another. A consequence of this important, opposing-vector situation is that the zones between adjacent magnetized regions also tend to exhibit a high degree of toner-collecting capability. Thus, in a finally printed visible image, there is a good continuum of the image in the zones between adjacent image portions. This is to be contrasted sharply with conventional magnetic image techniques in which such opposing vectors in zones between magnetized regions do not exist. Another important contribution of this phenomena is illustrated by the dashed line shown at 52 in FIG. 3. Here it has been assumed that a part of an overall image in which regions 42, 50 contribute has a portion of one of its edges defined by the lower edges of regions 42, 50 in FIG. 3. Because of the exhanced toner-capturing capability, just mentioned, of the zone between regions 42, 50, this zone tends to fill in with toner during a printing operation, and this tends to result in a relatively smooth, non-jagged toner edge, as represented by dashed line 52. It is through this inter-region toner-capturing enhancement that a printed image produced according to the apparatus of this invention exhibits a strikingly high degree of image edge definition.

Figure 5:
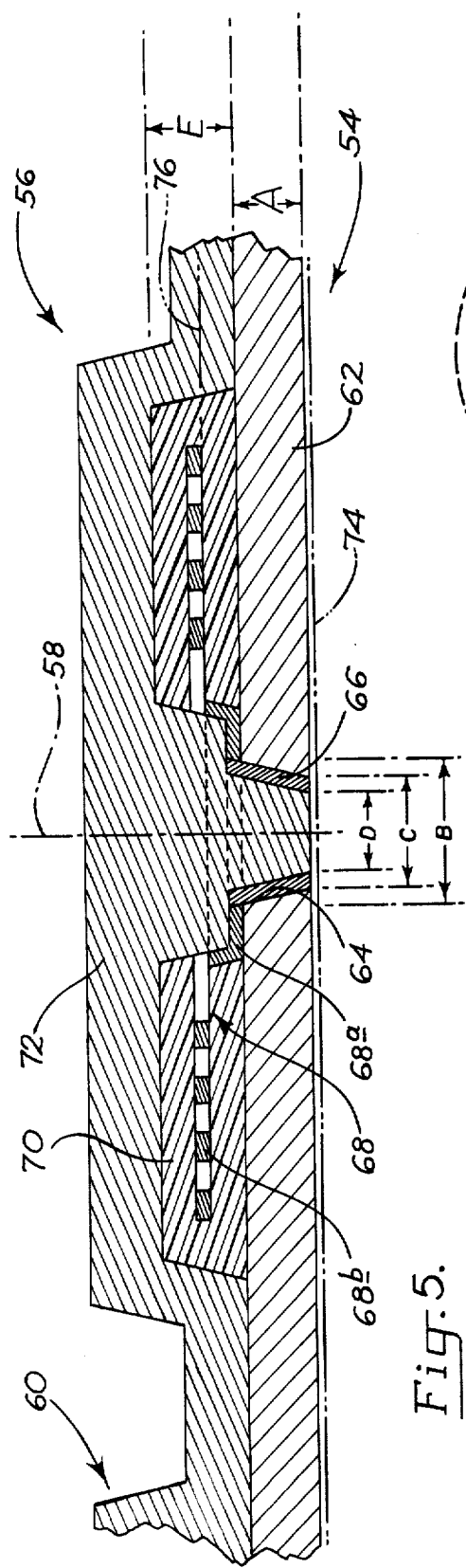
FIG. 5 is a cross-sectional view, on a much larger scale than that used in the earlier figures, depicting one extremely useful structure of a writing head made in accordance with the invention.
Figure 6:
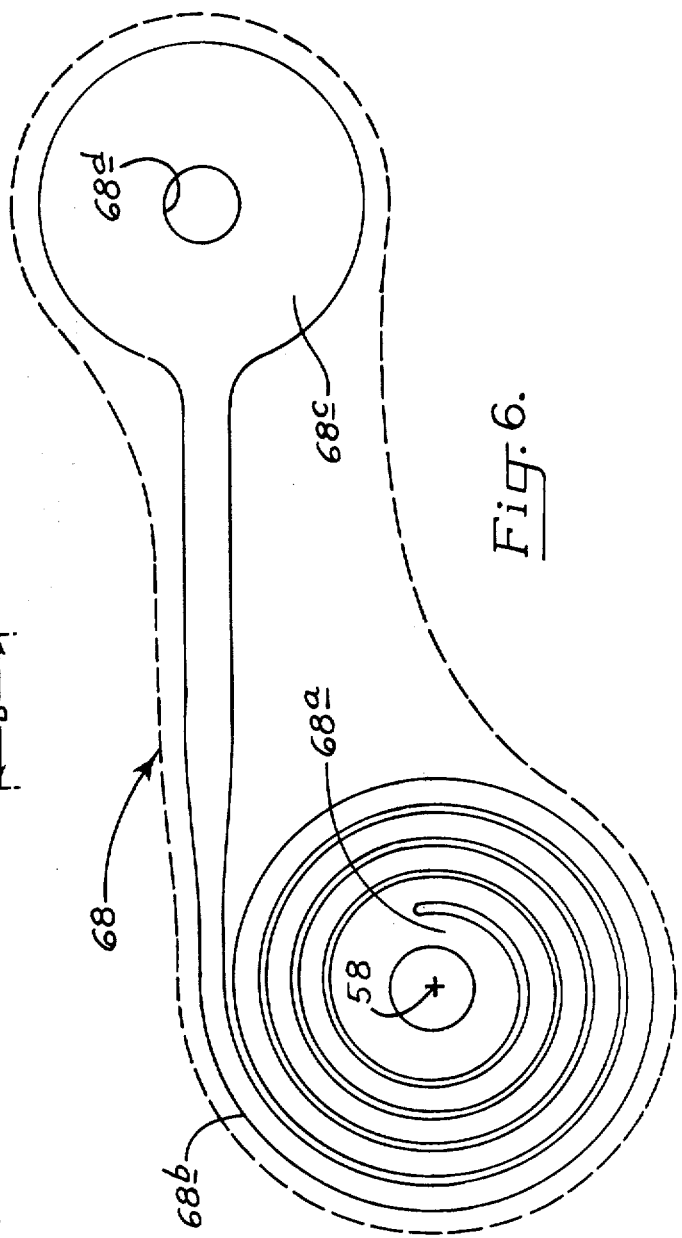
FIG. 6 is a reduced-scale view, taken from the point of view of the top side of FIG. 5, illustrating a conductive coil used in the writing head of FIG. 5.

The basic apparatus features of the invention have now been described. To simplify matters, such description has taken place in the setting of a rather elementary and simplified writing head, wherein dimensional considerations, and ultimate operational practicality, have been temporarily ignored. Further, the geometry, in a magnetic sense, of a magnetized region produced according to the invention, and the advantages of such geometry, have been discussed with the illustrations of FIGS. 2, 3 and 4. What will now be described are several somewhat more sophisticated writing head constructions that have been found to be extremely satisfactory for practical high-resolution image production. FIGS. 5 and 6 illustrates the first of these next-to-be-considered constructions, and attention therefore now directed to these two drawing figures.

Considering first of all FIG. 5, indicated generally at 54 is a practical magnetic writing-head structure including a plurality of writing heads, such as head 56, constructed in accordance with the present invention. Each head has what might be thought of as a pancake-sandwich construction, and when viewed from the point of view of the top side of FIG. 5, has a generally circular outline. The central axes, such as axis 58 for head 56, of adjacent heads in structure 54 are spaced apart herein by a distance of about 50-mils. One of a plurality of heads which are adjacent head 56 is shown fragmentarily at 60.

Head structure 54 herein, only a very small portion of which is shown in FIG. 5, takes the form of an endless flexible belt which is mountable on the outside of a supportive carrying drum. Further, and as will become apparent from the description which follows, structure 54 is extremely thin in cross-sectional dimensions, and is formed using thin-film and intergrated-circuit fabrication techniques. A number of advantages, many of which will be discussed shortly, are attained through this kind of construction.

Head 56 is representative of the construction of each other writing head in structure 54. What might be thought of as the foundation carrier in structure 54 is a flexible web 62 formed of a suitable, high-permeability magnetic material which is also electrically conductive. Two materials which have been found to be satisfactory are manufactured by Allied Chemical Company, and are sold under the designations 2826 MB Metglas ($Fe_{40}Ni_{38}Mo_4B_{18}$), and 2605 SE Metglas ($Fe_{81}B_{13.5}Si_{3.5}C_2$). Web 62 is also referred to herein as a magnetic means, and in the region of each writing head, such as in the region of writing head 56, constitutes what is referred to as a second magnetic pole means. In structure 54, web 62 has a thickness shown at A in FIG. 5 of about 1.5-mils.

Formed in web 62 (in a manner which will be described), and centered on axis 58, is a tapered aperture 64 which opens to both faces of the web. The upper, larger diameter end of aperture 64 in FIG. 5 has a dimension, shown at B, of about 225-microns. The lower, smaller diameter end of the aperture has a dimension, shown at C, of about 125-microns.

Formed within aperture 64, and distributed about the wall therein, is a gold collar 66. Collar 66, which functions as a diamagnetic material between pole faces in head 56, extends slightly above the top surface of web 62 in FIG. 5 (as can be seen), and has a wall thickness of about 18-microns. As a consequence, the diameter at the inside of the lower end of collar 66 in FIG. 5, represented at D, is about 90-microns.

As has already been mentioned, the material which makes up web 62, in addition to being a magnetic material, is also an electrically conductive material. Collar 66, in addition to functioning as a diamagnetic material which defines a low-permeability gap between pole faces in head 56, also functions to make electrical contact with web 62. The reason for such contact will be explained later.

Electrically contacting and surrounding the upper end of collar 66 in FIG. 5 is a copper cup 68a which forms part of a current-carrying conductor 68 in head 56. Also included in conductor 63, and formed integrally with cup 68a, is a spiral winding or coil 68b which is disposed substantially symmetrically about axis 58. As can be seen, coil 68b is substantially planar, and lies in a plane spaced somewhat above the top surface of web 62 in FIG. 5. The cross-sectional area of coil 68b is about 1-mil$^2$. Coil 68b is also referred to herein as an exciting means, spiral coil means and magnetic-flux-inducing means.

FIG. 6 provides a view along axis 58 toward the top side of coductor 68, with the latter removed from head 56. Here it can be seen that coil 68b makes, essentially, four turns about axis 58, and extends, then, tangentially a short distance away from axis 58 toward a terminating pad 68c. Pad 68c resides in substantially the same plane as coil 68b, and includes a central opening 68d, the purpose for which will be explained later.

Returing attention to FIG. 5, coil 68b and pad 68c are embedded and supported in a layer 70 of a suitable dialectric material. The thickness of this layer, shown at E, is about 26-microns. The specific material which forms layer 70 in head 56 herein is a product manufacured by E. I. Dupont deNemours & Co. sold under the name Pyralin. Another suitable product, also made by the same company, is sold under the designation PI-2555 Polyimid.

Completing a description of head structure 54, formed over the parts already described is a blanket 72 of a high-permeability but non-electrically conductive magnetic material which, in structure 54, takes the form of nickel-iron. As can be seen, this blanket extends downwardly, in the central portion of the head, into cup 68a and into the inside of collar 66. The portion of blanket 72 which fills collar 66 is referred to as a first magnetic pole means, and has a bottom face in FIG. 5 which is flush with the bottom face of web 62. Blanket 72 defines the top portion of head 56 in FIG. 5, and where it overlies coil 68b, has a generally circular configuration with a diameter of about 40-mils. Blanket 72 is also distributed over all of the other writing heads in structure 54, and performs with respect to each other head, exactly in the same manner as it does with head 56. The regions of contact between the blanket and web 62 constitute magnetic connections. Suitable clearance apertures are provided in the blanket to afford electrical connection access to the central openings in the various conductor terminating pads.

While numerous techniques may be used to produce writing heads such as head 56, the following one has been found to be especially satisfactory.

Web 62 is first prepared with a thin plating (several microns) of gold on its base—such a plating being represented by dash-double-dot line 74 in FIG. 5. This plating, which is later removed, functions as will be explained, to promote a smooth flush undersurface in finished head structure 54.

Next, the upper surface of the web is coated (in any suitable manner) with Pyralin—this coating extending above the surface of the web substantially to the level of dash-triple-dot line 76 in FIG. 5. The continuous Pyralin coating is then etched selectively to define the specific locations for the multiple heads which are to be included in structure 54. After such etching, the resulting Pyralin islands (which define each such location) each have a generally circular main body with a central circular opening, and a generally radial projection joined to the body. With respect to each such island, the circular main body portion is for receiving a conductor, such as conductor 68, the central opening is for receiving the cup in the conductor, such as cup 68a, and the projection is for receiving the termination pad in the conductor, such as pad 68c.

It should be understood that in order to achieve the head density mentioned earlier in structure 54, the Pyralin islands provided for receiving the conductors in the heads will typically differ somewhat from one another. More specifically, many islands will be characterized by rather elongated, and even twisting, projections which thread in the spaces between heads, all for the purpose of accommodating convenient locations for electrical connections to the termination pads. Thus, the particular island which is shaped to support conductor 68 (see the dashed line in FIG. 6) is but typical in a general sense of islands provided for the other conductors in structure 54.

Following preparation of the Pyralin islands just described, the top surface of what exists so far in structure 54 is plated with copper, and is subsequently photoetched to create the conductors. Following etching, all that is left of the originally plated copper are the specific coils (cups, windings, pads, and openings) for the different heads. Preparation of the copper conductors is followed by placement of another coat of Pyralin over the entire structure. This second coat is subsequently etched selectively so that what remains, essentially, only overlies the previously prepared islands, with openings etched to provide access to the cups in the conductors, as well as to the termination pads therein.

What next occurs is that the apertures for the heads, such as aperture 64 for head 56, are prepared through any one of a number of conventional techniques, such as by electro-drilling. Following drilling of the apertures, the insides thereof are suitably plated with gold to produce collars, such as collar 66. This is done in a manner assuring that the upper ends of the collars connect electrically with the cups in the conductors. The collars also connect electrically with web 62.

After the collars are prepared, nickel-iron blanket 72 is laid down over the entire structure to fill around each writing head, as shown for head 56 in FIG. 5. Selective etching of this blanket is then performed to provide access to the termination pads in the conductors. Finally, the bottom surface of the web is treated to remove gold plating 74—thus to produce a smooth, continuous, finished underside surface for structure 54. While preparation of a writing head structure could be performed without the presence of gold layer 74, experience has shown that during electro-drilling (or the like) to produce the writing head apertures, deformation (flaring) can occur where the apertures join with the undersurface of web 62. With layer 74 present, any deformations which occur take place in the layer rather than in the web. Removal of the layer then leaves a flush undersurface. For maximum performance in terms of magnetic writing, it is important that the pole faces at the base of each aperture be substantially flush with one another.

A multiple writing-head structure thus prepared may then be mounted for use in any suitable fashion. Web 62, because of its electrical current-carrying characteristics, acts as a common conduction medium for all of the conductors in the heads. The opposite ends of each conductor are connected independently through suitable switching circuitry to the other side of a power supply for energizing the different conductors. The exact natures of these connections form no part of the present invention, and thus are not described herein.

Figure 7:
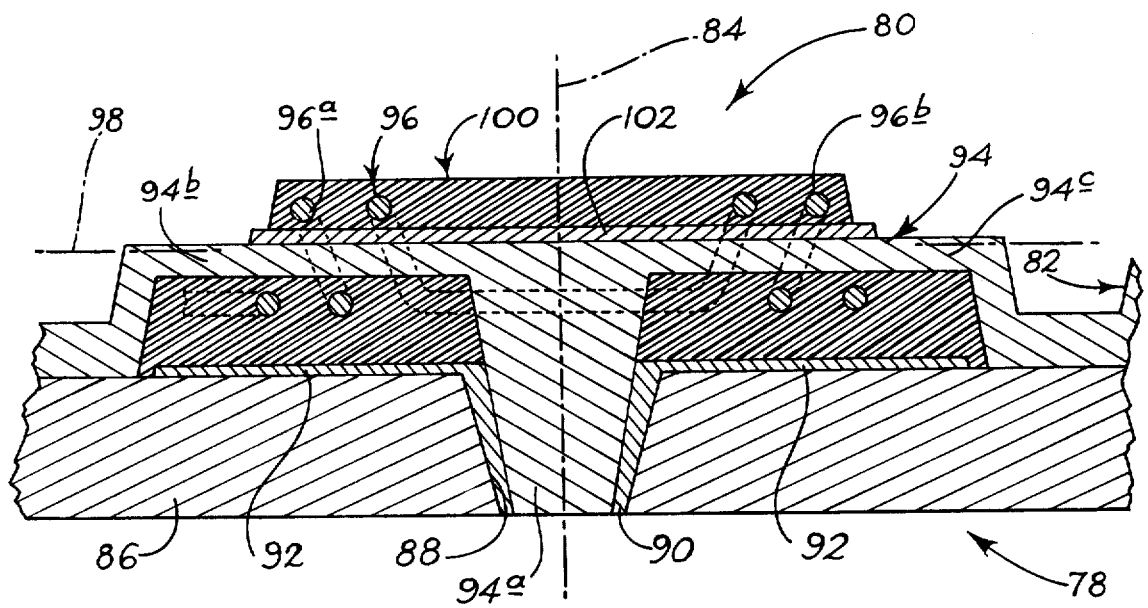
FIG. 7 is a view similar to FIG. 5, and shows another form of writing-head construction.
Figure 8:
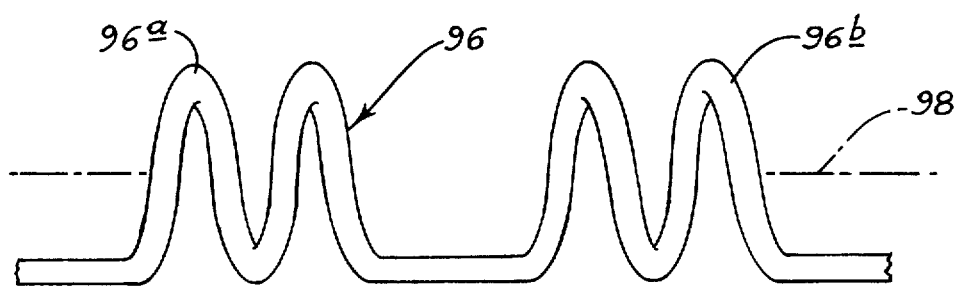
FIG. 8 is an enlarged-scale view taken from substantially the same point of view of FIG. 7, showing a conductive coil used in the head of FIG. 7.
Figure 9:
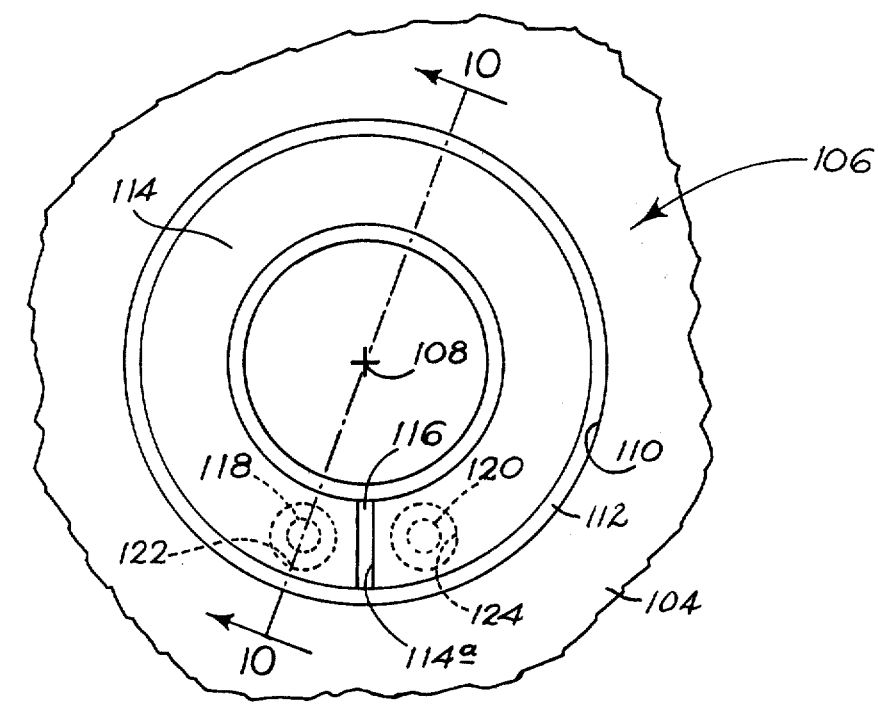
Figure 10:
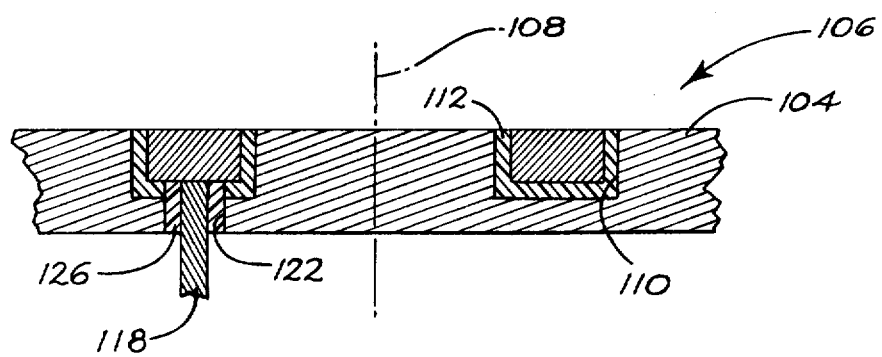

Turning attention now to FIGS. 7 and 8, indicated generally at 78 in FIG. 7 is an alternate form of a writing head structure which is similar in some respects to structure 54. Structure 78 includes a plurality of magnetic writing heads, such as the two shown at 80, 82. The axis of head 80 is shown by dash-dot line 84, and is spaced from the axes of adjacent heads in the same manner described for structure 54.

Included in structure 78 is a web 86 which functions like previously mentioned web 62, in which, for each writing head, there is an aperture, such as aperture 88 for head 80. The material forming web 86 is the same as that forming web 62, such material defining a pole member at the location of each head. Web 86 has substantially the same thickness as web 62.

It will be recalled that the individual writing heads formed in structure 54 have a generally circular, pancake-like configuration. By way of contrast, the writing heads in structure 78 have a generally oblong configuration. For example, the long axis of head 80 (as shown in FIG. 7) lies substantially in the plane of FIG. 7. As will become apparent, a reason for this difference in head configuration resides in a specific difference in the respective energizing coil configurations.

Formed in aperture 88 is a gold collar 90 which performs in the head in the same manner as does collar 66 in head 56. Where collar 90 rises past the upper surface of web 86 in FIG. 7, it joins integrally with a pair of elongated wing-like gold layers 92 that extend axially away from one another over the top surface of the web 86. These layers follow, generally, the direction of the long axis of head 80.

Forming a second pole member in head 80 is a blanket 94 of the same magnetic material used to form previously described blanket 72. As was true with regard to blanket 72, blanket 94 is distributed over the entirety of structure 78 to provide one of the pole members in each of the other writing heads in the structure. In the region of each writing head, such as in the region of head 80, the blanket, as viewed in cross section along a plane containing the long axis of the head, has the generally T-shaped configuration shown in FIG. 7. Thus, the blanket includes a central stem 94a which extends downwardly into collar 90—such stem joining, adjacent its upper end, with a pair of substantially coaxial outwardly extending arms, such as arms 94b, 94c. At the outer terminations of these arms, the blanket extends toward and contacts web 86 as shown. Thus, the blanket has a magnetic connection with the web.

Provided for energizing head 80 is a conductor 96 which includes spaced coaxial coils 96a, 96b which extend about arms 94b, 94c, respectively. The common axis of coils 96a, 96b is shown by dash-dot line 98.

Considering FIG. 8 along with FIG. 7, coils 96a, 96b spiral in reverse directions about axis 98. Were one to take a view of conductor 96 along axis 98 from the left side of the coil in FIG. 8, and were one to trace along the conductor from what is shown as its left end in FIG. 8 toward its right end thereof in FIG. 8, the moving tracer would, throughout its travel in coil 96a, move in a counterclockwise direction, and throughout its travel in coil 96b, move in a clockwise direction. The reason for having a reverse-spiral configuration in conductor 96 will be explained shortly.

Generally surrounding arms 94b, 94c is a generally tubular formation of Pyralin shown generally at 100.

This formation extends in the space between the undersides of arms 94b, 94c and the top sides of gold layers 92, around the sides of the arms, and centrally over the tops of the arms. Where this Pyralin formation extends over the tops of the arms and stem 94a, a spacing layer of copper is provided—such layer being shown generally at 102.

Considering what occurs for the opposite ends of conductor 96, one of these ends makes electrical contact with web 86, and the other extends toward a termination pad, such as the termination pad described earlier, which pad is supported on an exposed portion of Pyralin formation 100.

While the internal construction of the writing heads in structure 78 appears to be somewhat more complex than that of the heads in structure 54, the manufacture of a writing head like head 80 is well within the skill of those skilled in the art, using techniques such as those described earlier for the manufacture of head 56. The reason for using reverse-spiral coils in conductors, such as conductor 96, is that with current flowing in a given direction in such a conductor, magnetic flux produced by each of the coils is directed in reverse directions, thus to generate a strong magnetic pole in the associated stem, such as stem 94a.

The apparatus of the invention has thus been described in conjunction with plural embodiments. In each such embodiment, energizing of a writing head produces a pair of opposite-polarity pole faces which are capable of creating a magnetized region, in a magnetic image-storage medium, characterized by magnetic vectors distributed generally with spherical geometry. Those skilled in the art will appreciate from what has been disclosed herein that there are a number of different ways to embody the invention, and also to modify the specific structures shown herein. It is believed, now, to be fully apparent how the objects of the invention are attained, and how such attainment produces the various magnetic writing and printing advantages outlined above. Accordingly, while several embodiments of the invention have been discussed herein specifically, it is appreciated that variations and modifications may be made without departing from the spirit of the invention.

I claim:

1. In an imaging system of the type employing a magnetic image-storage medium having a magnetizable facial expanse which is placeable operatively in an image-producing zone within the system, selectively excitable, thin-film, pancake-sandwich-like magnetic pole means including first and second pole portions with one pole portion extending in a magnetically gapped manner through an aperture in the other pole portion, said pole means being disposed adjacent said zone, and arranged to confront closely such a facial expanse, with the pole means being excitable to produce in a face thereof a pair of opposite-polarity magnetic poles having geometries effective to establish, in such an expanse when so placed in said zone, a defined magnetized region characterized by plural, multi-directionally oriented magnetic vectors distributed generally with spherical geometry with respect to the expanse, and thin-film spiral coil means operatively connected to and sandwiched between said pole portions for exciting the same, said spiral coil means being spaced from said first and second poles, and from said aperture in said other pole portion.

2. In an imaging system of the type useable with a magnetic image-storage medium which is placeable operatively in an image-producing zone within the system, thin-film apparatus for producing in such a medium, when so placed in said zone, an image portion, with such taking the form of a defined magnetized region in the medium, such region being characterized by multi-directionally oriented magnetic vectors extending both at different angles substantially within the plane of the medium, and at different angles across such plane, said apparatus comprising first thin-film, planar pole means disposed adjacent said zone excitable to define in a face of the apparatus a first magnetic pole expanse of one polarity arranged to confront closely one face of a medium placed within the zone, second thin-film, planar pole means also disposed adjacent said zones excitable to define, with respect to said first pole expanse, and in the same said face of the apparatus, a related second magnetic pole expanse of the opposite polarity, said second pole means including an aperture through which said first pole expanse extends in a magnetically gapped manner with said second pole expanse generally symmetrically surrounding said first pole expanse, and being arranged to confront closely the same face of a medium placed within the zone, and thin-film spiral coil means operatively connected to and sandwiched between said first and second pole means for exciting the same, said spiral coil means being spaced from said first and second expanses, and from said aperture in said second pole means.

3. Thin-film, planar apparatus for producing a generally doughnut-shaped magnetic image portion in a magnetic image-storage medium comprising first magnetic means defining a thin-film magnetic web including an aperture opening to opposite faces of the web, second magnetic means disposed on one side of said web including one portion spaced from said aperture and in magnetic-circuit contact with said web, and another portion extending in a magnetically gapped, noncontacting manner through said aperture with a face which is substantially flush with the opposite side of said web, and electrical current-carrying means, including spiral coil means spaced from said aperture and distributed in a sandwiched manner relative to and encompassed by said two magnetic means in a manner capable of inducing magnetic flux in said two magnetic means.

4. The apparatus of claim 3, wherein said spiral coil means takes the form of a coil distributed about said second magnetic means' said other portion generally with circumferential symmetry relative to said aperture.

5. The apparatus of claim 3, wherein said spiral coil means is distributed about yet a third portion in said second magnetic means, which third portion magnetically joins said one and other portions.

6. The apparatus of claim 5, wherein said second magnetic means has a generally T-shaped configuration, with its said third portion having a pair of generally coaxial arms forming the cap in such shape, and said spiral coil means includes a spiral coil disposed about each arm, said spiral coils being connected electrically and in series, and being arranged in oppositely spiraling directions relative to the axes of said arms.

7. Thin-film apparatus for producing a generally doughnut-shaped magnetic image portion in a magnetic image-storage medium comprising generally planar, thin-film, sandwich-like magnetic pole means including first and second, magnetically joined pole-defining portions having, on one face of the plane of said pole means, coplanar pole faces, with one of said pole faces being generally circular, and with the other pole face including an expanse magnetically spaced from and generally symmetrically surrounding said one pole face, and electrical current-carrying means, including thin-film spiral coil means sandwiched between said two pole-defining portions and distributed relative thereto in a manner capable of inducing magnetic flux therein and across the space, on one side of said plane, between said pole faces.

8. The apparatus of claim 3, wherein said second magnetic means has a generally T-shaped cross section when viewed in a plane generally normal to the opposite side of said web, and further has a third portion being a generally sheet-like film forming the cap in such shape, and said coil means includes a helical coil distributed in a plane generally parallel with said web's opposite side interposed said third portion of said second magnetic means and said web.

9. The apparatus of claim 3, wherein one of said magnetic means is electrically conductive, and cooperates electrically conductively with said current-carrying means.

10. Thin-film, pancake-sandwich-like, electro-magnetic imaging structure comprising a flexible, thin-film magnetic web having an aperture opening to opposite faces of the web, a thin-film blanket of magnetic material including one portion spaced from said aperture in magnetic-circuit contact with, and distributed adjacent, one face of said web, and another portion extending in a magnetically gapped manner through said aperture with a facial expanse which is substantially flush with the other face of said web, and spiral coil means spaced from said aperture, and sandwiched between and encompassed by said web and blanket adjacent the web's said one face in a manner capable, when energized, of inducing magnetic flux in the web and blanket to produce on said web's said other face, in the region of said aperture, opposite-polarity magnetic poles.

* * * * *